No. 749,924. PATENTED JAN. 19, 1904.
P. VAN DUIJN & L. W. VAN THIEL.
LOCKING DEVICE FOR NUTS, &c.
APPLICATION FILED MAR. 5, 1903.
NO MODEL.
Fig. 1.
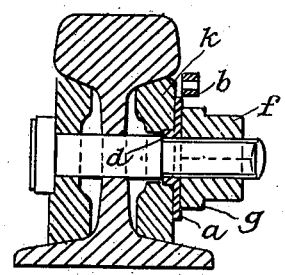
Fig. 5.  Fig. 2.  Fig. 4.
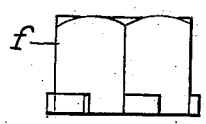 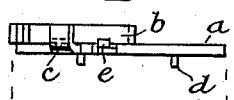 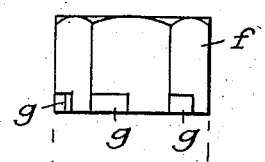
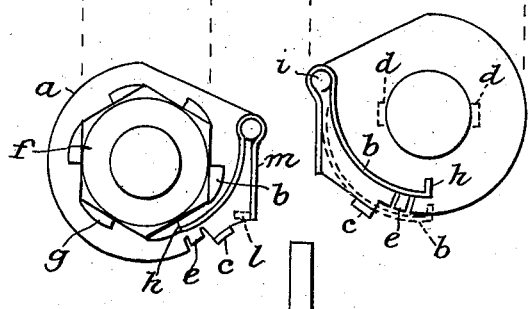 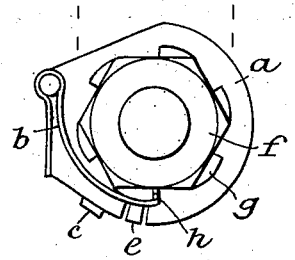
Fig. 3.  Fig. 6.
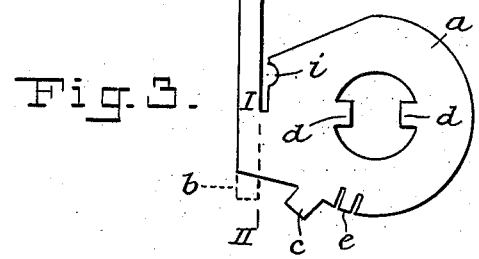 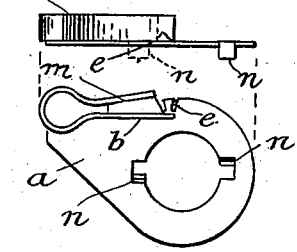
Witnesses:
J. B. Bolton
F. L. Middleton
Inventors:
Pieter van Duijn
Lambertus Wilhelmus van Thiel
By Richards & Co
their Attorneys.
THE NORRIS PETERS CO., PHOTO-LITHO., WASHINGTON, D. C.

No. 749,924. Patented January 19, 1904.

UNITED STATES PATENT OFFICE.

PIETER VAN DUIJN, OF ALMELO, AND LAMBERTUS WILHELMUS VAN THIEL, OF HELMOND, NETHERLANDS.

LOCKING DEVICE FOR NUTS, &c.

SPECIFICATION forming part of Letters Patent No. 749,924, dated January 19, 1904.

Application filed March 5, 1903. Serial No. 146,390. (No model.)

*To all whom it may concern:*

Be it known that we, PIETER VAN DUIJN, residing at Almelo, Overijssel, and LAMBERTUS WILHELMUS VAN THIEL, residing at Helmond, North Brabant, Netherlands, subjects of the Queen of the Netherlands, have invented a certain new and useful Improvement in Locking Devices for Nuts and the Like, of which the following is a specification.

This invention relates to an improvement in locking devices for nuts and the like, the object being to provide a locking device fulfilling the following requirements—viz., reliability, simplicity, cheapness of production, and adaptability.

According to the invention the nut is arranged to act as a ratchet-wheel, projections, ratchet-teeth, or the like being formed at the base thereof for this purpose and engaging with a pawl constructed in one with a washer underlying said nut. Suitable means are provided for holding said pawl out of engagement with said projections on the nut, so that it may be screwed on and off when desired. Lugs are also provided on the washer to prevent its rotation with the nut.

The invention is illustrated in the accompanying drawings, in which—

Figure 1 is a section through a rail-joint embodying this invention. Fig. 2 is a view of the washer and locking device. Fig. 3 is a view of the flat sheet of steel plate of which the washer is made. Figs. 4 and 5 illustrate two methods of carrying this invention into practical effect, and Fig. 6 is a modification adapted for use with wood fittings.

The device consists of a washer part $a$, having lugs $d$, which fit into the slots formed in the fish-plate $k$ or other parts to be secured to prevent its rotation. The periphery of said washer is provided with a lug $c$ and a lug or detent $e$ to hold the pawl $b$ when it is desired to withdraw same from engagement with the projections $g$ on the nut $f$, the said pawl $b$ also being formed in one with the washer $a$, and if it is desired to use the construction illustrated in Fig. 4 a lug $h$ is formed on the end of said pawl.

Instead of making the stop or lug $c$ from the part $a$ it may be formed by extending the part $m$ of the pawl $b$ at the lower extremity and bending such extension at right angles, as shown at $l$ in dotted lines, Figs. 3 and 5, or the part $m$, being directly attached to $a$, may serve as a stop, as shown in Fig. 6, in which case the parts $c$ or $l$ may be dispensed with and the lug or detent $e$ be brought closer to the part $m$.

The nut $f$ is provided with a number of projections $g$ around its lower periphery and is made of sufficient depth to allow room for a spanner above the projections.

The number and form of the lugs $d$ and $e$ and of the projections $g$, the shape of the nut $f$ and the pawl $b$ may be varied according to requirements. Thus, for instance, the projections $g$ may be replaced by teeth all round the base of the nut, or notches may be cut in the periphery of same into which the lug $h$ of the pawl may engage; but it is preferred to use the construction shown in Fig. 4. The pawl $b$ may be so arranged as to be under tension or compression, as shown in Figs. 4 and 5, respectively. In the former case should the nut be unscrewed prior to the pawl $b$ being disengaged and held by the detent $e$ the lug $h$ will either be sent back or broken off. Should this occur, it may either be returned to its proper shape or another lug may be formed on the pawl. Should, however, the pawl be under compression, its relative position to the movement of rotation of the nut is reversed, it being unnecessary to form a lug on the end thereof. Should the nut be unscrewed while the pawl is in engagement, the pawl will buckle or break, but can be easily repaired or replaced by a new washer.

The modification shown in Fig. 6 is intended for wooden connections, and for this purpose the lugs $d$, which lay tangentially to the screw, would not afford a sufficient hold in the wood. The lugs $n$ are therefore cut and turned up, so as to lay radially to the screw, by which means a firm grip is assured.

The method of using the device is as follows: The washer $a$ being in position, the pawl $b$ is drawn back behind the lug $e$, the stop $c$ preventing it being drawn back too far. The nut *f* may then be screwed on in the ordinary manner. The pawl is then sprung over to engage the nut, which is then screwed home until it reaches the position shown in Figs. 4 and 5. It thus becomes impossible for the nut to work loose from any cause, as the pawl holds it fast by one of the projections *g*.

The locking device herein described is advantageous in that it is perfectly reliable and obviates the necessity for fitting the threads with tightness in order to prevent the nut working loose. Hence the risk of the parts rusting together is correspondingly diminished, and the screws being easy fitting the work of tightening and loosening the nuts is facilitated and the frequency of breakage of the bolts is diminished. Moreover, the connections do not require such frequent tightening up. The device can also be adapted to any of the screw connections now existing without much expense and may be applied not merely to nuts, but also to screw-bolts, to wood-screws, and to any articles fastened together by means of screw-threads.

What we claim is—

1. A device for locking nuts, comprising in combination with a nut and projections thereon, a washer and a strip formed in one piece with same, such strip being bent at right angles to the washer for a portion of its length and then bent back upon itself to form a spring-pawl adapted to engage the projections of the nut, the right-angular portion limiting the backward movement of the spring portion.

2. A device for locking nuts, comprising in combination with a nut and projections thereon, a washer and a strip formed in one piece with same, such strip being bent at right angles to the washer for a portion of its length and then bent back upon itself to form a spring-pawl adapted to engage the projections of the nut, means for limiting the backward movement of such strip, and means for holding same out of engagement with the nut.

3. A device for locking nuts, comprising in combination with a nut and projections thereon a washer formed in one with a spring-pawl *b*, lugs *e* and *c* for holding the spring-pawl out of engagement with the nut and limiting its movement respectively and means for preventing the rotation of the washer.

In testimony whereof we have hereunto set our hands in the presence of two subscribing witnesses.

PIETER VAN DUIJN.
LAMBERTUS WILHELMUS VAN THIEL.

Witnesses:
WILLIAM GARDINER ANTHONY CHARLES ALBERS,
JOHANNES D. FUHRING.